P. VON BARTKOWSKI.
LIQUID MEASURING DEVICE.
APPLICATION FILED MAY 2, 1912.
1,050,046.
Patented Jan. 7, 1913.
2 SHEETS—SHEET 1.
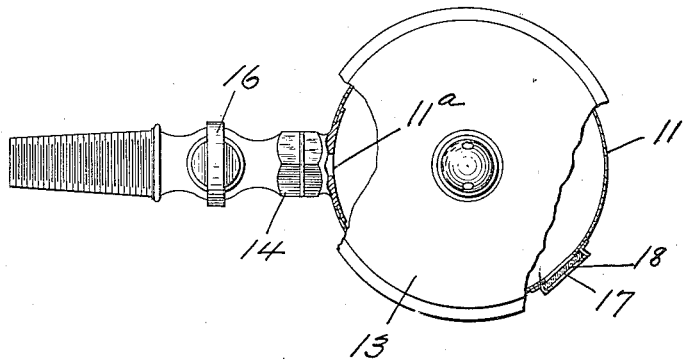
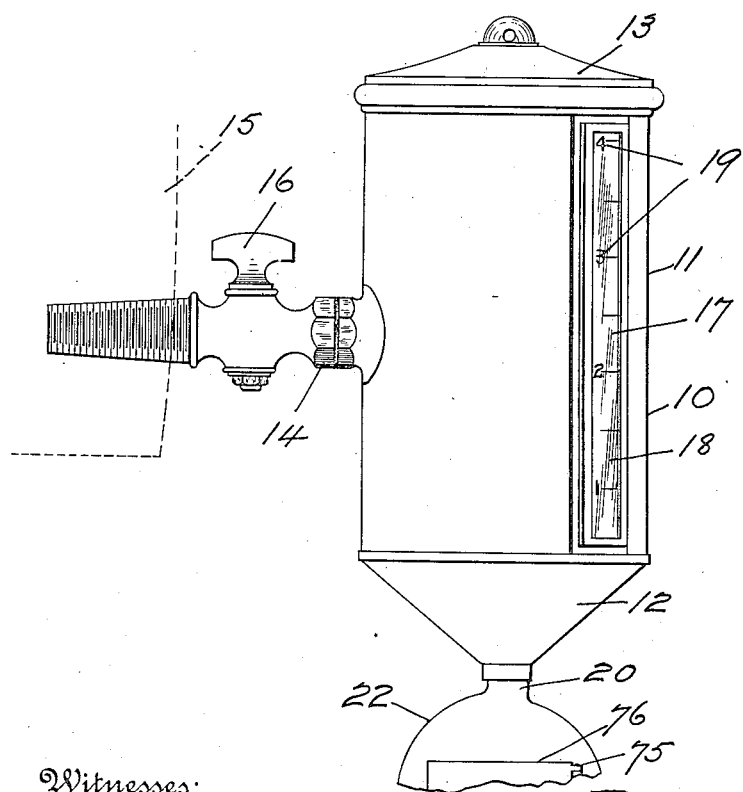

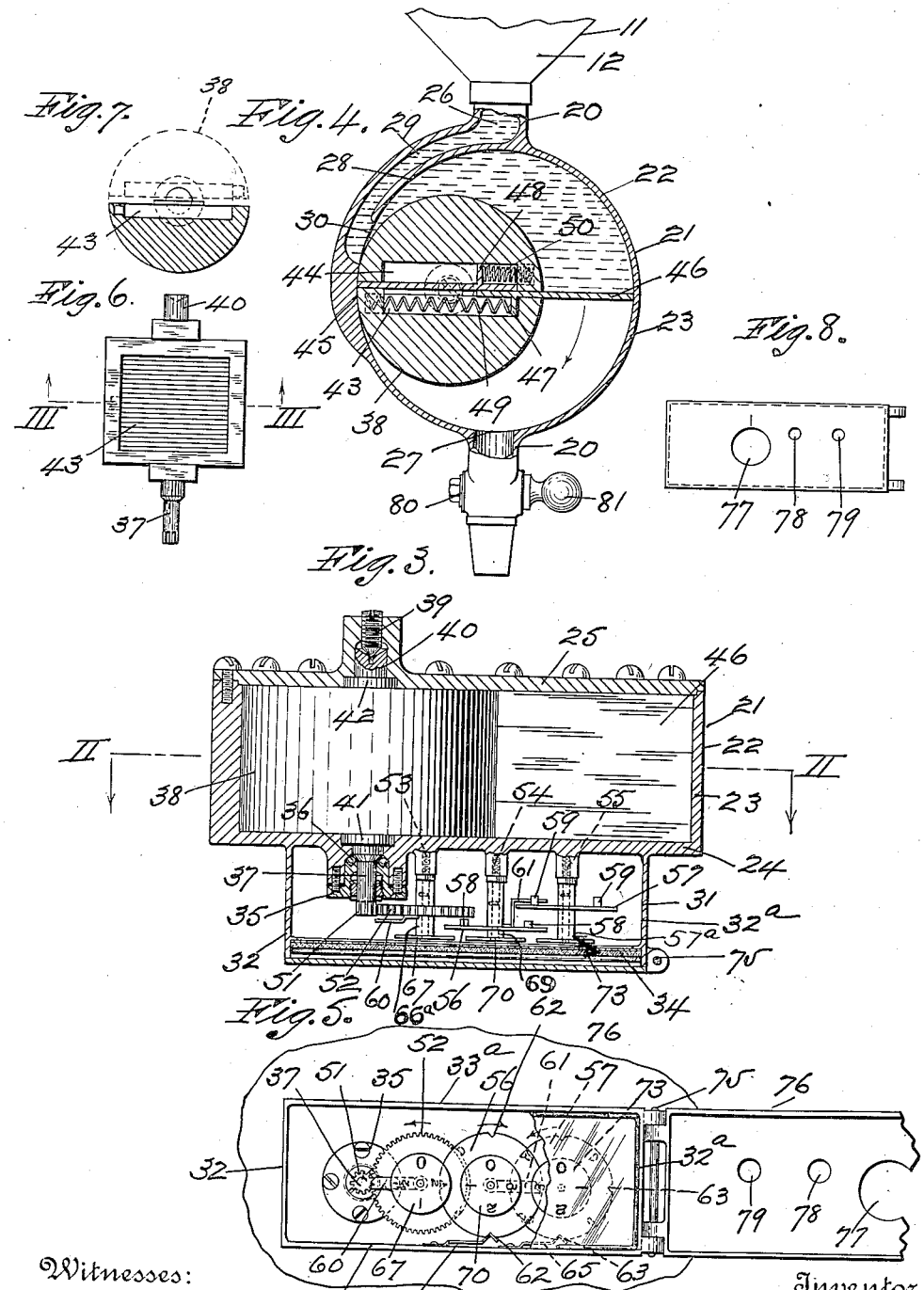

UNITED STATES PATENT OFFICE.

POLIKARB VON BARTKOWSKI, OF NEW YORK, N. Y.

LIQUID-MEASURING DEVICE.

1,050,046.  Specification of Letters Patent.  Patented Jan. 7, 1913.

Application filed May 2, 1912. Serial No. 694,708.

*To all whom it may concern:*

Be it known that I, POLIKARB VON BARTKOWSKI, a citizen of the United States, and a resident of New York, borough of Brooklyn, county of Kings, and State of New York, have invented a certain new and useful Improvement in Liquid-Measuring Devices, of which the following is a full, clear, and exact specification.

This invention relates to a class of devices adapted to be used for measuring liquid when being dispensed from a container.

My invention has for its object primarily to provide a device designed to be employed in conjunction with a receptacle containing a liquid, and which is adapted to accurately measure a desired quantity of the liquid to be dispensed, thus overcoming the objections incident to the present methods in use whereby a number of separate measures are employed to permit various quantities of the liquid to be dispensed as well as requiring the use of a large number of measures so as to avoid contaminating the contents taken from one receptacle with that taken from another.

Another object of the invention is to provide a registering apparatus which serves as a means to record consecutively the various quantities of the contents dispensed from the receptacle at intervals whereby the exact amount thereof which is sold and the quantity remaining in the receptacle may be readily computed without requiring access to the receptacle.

A further object of the invention is to provide a measuring device adapted to be employed especially in conjunction with barrels, or other containers in which are carried large quantities of liquids, such as alcoholic liquors, oils, paints, and the like, and which is simple and efficient in construction.

A practical embodiment of the invention is represented in the accompanying drawing forming a part of this specification in which similar characters of reference indicate corresponding parts in all the views, the said invention being more fully described hereinafter and then pointed out in the appended claims.

In the drawing, Figure 1 is an elevation, showing the receptacle in detail and a fragmentary view of the register of one form of liquid measuring device embodying my invention. Fig. 2 is a top plan, partly in section, of the receptacle of the device. Fig. 3 is a longitudinal section through the register of the device. Fig. 4 is a section taken on the line II—II of Fig. 3. Fig. 5 is a fragmentary detail view of the registering disks of the register. Fig. 6 is a detail plan of the straight surface of one of the sections of the drum of the register with the spring removed therefrom. Fig. 7 is a section taken on the line III—III of Fig. 6, and Fig. 8 is a front view of the door of the register.

The liquid measuring device 10 has a receptacle 11 provided with a substantially cone-shaped bottom 12 and a removable top, or cap 13. The receptacle 11 may be of any suitable shape, or size, but is made preferably so as to have a capacity of one gallon. In the wall of the receptacle 11 is held one end of a pipe 14 the other end of which may be inserted through an opening in a barrel, as 15, or other container carrying the liquid, such as alcoholic liquors, oils, paints, or the like which is to be dispensed through the medium of the device 10. Interposed in the pipe 14 is a cut-off cock 16 of any suitable form, and by the use of which the flow of the liquid from the container to the receptacle may be controlled.

In the wall of the receptacle 11 is provided an indicator 17 which consists of a plate of glass, or other transparent material 18 having numerals or other characters 19 thereon to indicate certain measures of the liquid received by the receptacle from the container, and which will permit the person dispensing the liquid to observe the exact amount to be allowed to flow from the receptacle, for instance, a pint, or a quart, or a gallon. At the apex of the cone-shaped bottom 12 of the receptacle is an outlet in which is held one end of a pipe 20, and for the purpose of keeping an accurate register of each measure of the liquid dispensed at consecutive intervals from the receptacle as well as keeping a register of the total amount of the liquid dispensed, interposed in the pipe 20 is a registering apparatus 21. The registering apparatus 21 has a casing 22 composed of an approximately circular shaped wall 23, a front plate 24, and a back plate 25. In one part of the wall of the casing is an inlet 26 which communicates with the passage of the pipe 20 leading direct into the receptacle. In the opposite part of the wall of the casing is an outlet 27 which is also in communication with the passage through the pipe 20. Within the casing 22 and disposed from about the center of one part of the wall thereof so as to extend transversely across the inlet 25 is a partition 28 which is spaced from the circular wall, in order to provide a passage 29 having communication with the interior of said casing by an opening 30 formed in the partition 28. Upon the front plate 24 of the casing 22 is a second casing 31 which is preferably substantially rectangular in shape and said casing has side walls 32, 32ª, a bottom plate 33, a top plate 33ª, and a front plate 34. The front plate 24 of the casing 22 has a journal box 35 in which is an anti-friction bearing 36 for the shaft 37 of a drum 38 which is rotatable with said shaft, and in the back-plate 25 of said casing is a needle-bearing 39 which pivotally carries the socketed end of a short shaft 40 of the drum 38. As shown in the drawings the drum 38 is considerably smaller in diameter than the interior of the casing 22, and said drum is positioned eccentrically with relation to the axial center of the front plate and back plate of the casing. The drum 38 is divided into two equal lengthwise sections, and the shafts 37 and 40 may also be split and held so as to rotate in sleeves 41 and 42 provided in the journal box 35 and in the back plate 25, respectively of the casing 22. The sections of the drum 38 are arranged so that the straight faces thereof are spaced apart in opposed relation, and in each of the straight faces is a rectangular recess 43 and 44. In the space thus provided between the sections of the drum are guided two blades 45 and 46. The blades 45 and 46 are adapted to be moved in unison in opposite directions from the axial center of the drum 38, and for this purpose upon each of said blades are lugs 47 and 48, respectively, each of which is disposed in one of the recesses 43 and 44 of the sections of the drum. In each of the recesses 43 and 44 is a spring 49 and 50 which springs normally serve to force the lugs 47 and 48 in a direction to carry the blades 45 and 46 so as to be in movable engagement with the inner surfaces of the wall as well as the front plate and back plate of the casing 22. By this arrangement it is evident that when the liquid is delivered into the receptacle 11 it will flow therefrom through the inlet 26 into the passage 29 of the casing 22, through the opening 30, and into the interior of the casing. The liquid will then contact with one of the blades 45 and 46, and force it toward the outlet 27 of the casing 22 and at the same time the drum 38 will be rotated.

Upon the free end of the shaft 37 and within the interior of the second casing 31 is a pinion 51 meshing with a gear 52 which is adapted to make one revolution to four revolutions of the pinion. The gear 52 is freely rotatable upon a shaft 53 having one of its ends rigidly held in a boss provided upon the front plate 24 of the casing 22. Also on the front plate 24 and within the casing 31 are two other spaced apart bosses, each having a shaft 54 and 55 rigidly held therein. On the shaft 54 is a freely rotatable circular plate 56 and on the shaft 55 is a freely rotatable circular plate 57. Extending from one face of the plate 56 are a plurality of pins 58 which are spaced apart at regular intervals, and upon the corresponding face of the plate 57 are also a plurality of pins 59 which are likewise spaced apart at regular intervals. In the drawings, I only show four of the pins 58 and 59 as used upon each of the plates 56 and 57, though I may employ any desired number of the pins upon each plate so that a total register may be kept upon the register of any given quantity dispensed from the receptacle 11.

Upon one face of the gear 52 is a projecting arm 60 which is adapted to be swung when said gear is rotated so as to engage one of the pins 58 of the plate 56, and upon the plate 56 is a projecting arm 61 which is adapted to be swung when said plate is partially rotated by the arm 60 of the gear 52 so as engage one of the pins 59 of the plate 57 which in turn will also be partially rotated. In the edge of each of the plates 56 and 57 is a plurality of notches 62 and 63 adapted to be engaged by springs 64 and 65 which are fastened to the bottom plate 33 of the casing 31, and one of said notches is provided midway between each pair of the pins of the plates, in order that the springs may check the rotation of the plates so that the next pin will be in the path of movement of one of the arms 60 and 61 when the gear 52 and plates 56 and 57 are subsequently partially rotated. To the gear 52 is held one end of a sleeve 66ª and upon the opposite end of the sleeve and revoluble in unison with the gear 52 is a disk 67 having upon its exposed face a plurality of members, or other suitable characters for registering the number of pints of the liquid which are allowed to flow at one interval from the receptacle through the register. To the plate 56 is held one end of a sleeve 69 and upon the opposite end of the sleeve and revoluble simultaneously with the plate 56 is another disk 70 having upon its exposed face a plurality of numbers, or other characters for registering the number of quarts of the liquid which are permitted to flow at one interval from the receptacle through the register. To the plate 57 is held one end of a sleeve 57ª and upon the opposite end of the sleeve and revoluble in unison with the plate 57 is still another disk 73 having upon its exposed face a plurality of numbers, or other characters for registering the total number of gallons which has been dispensed from the container to the receptacle and from the receptacle through the register. Hinged, as at 75, to the side wall 32ª of the rectangular casing 31 is a door 76 which may have its other end detachably fastened by any suitable catch to the opposite end of the second casing, and in said door are openings 77, 78, 79, each of which is arranged so that one of the numbers, or characters of each of the disks 67, 70, 73 may be observed therethrough. Upon the end of the pipe 20 in proximity to the outlet 27 of the casing 22 is a faucet 80 through which the liquid is dispensed and the passage through which is controlled by any well known, or preferred type of valve 81.

When it is desired to dispense liquid from a container through the medium of my measuring device the valve 81 is rotated to close the faucet 80 of the pipe 20. The cock 16 is rotated to open the passage through the pipe 14 for passage of the liquid into the receptacle 11. When sufficient quantity of the liquid is received into the receptacle the cock 16 is rotated to close the pipe 14, and the valve 81 is rotated to open the faucet 80. The liquid will then pass into the interior of the casing 22 of the register, and the drum 38 will be revolved, as above described, for rotating the shaft 37 and the pinion 51. The gear 52 will thereby be revolved, and for each one of its revolutions a pint, or any given quantity, of the liquid will be indicated in the opening 77 of the door 76 by the disk 67. With the rotation of the gear 52 the arm 60 thereof will contact with one of the pins 58 of the plate 56, and this plate will be rotated the quadrant of a circle, or a proportion thereof, for rotating the disk 70 to indicate in the opening 78 of the door a quart, or other quantity greater than a pint of the liquid dispensed. With the rotary movement of the plate 56 the arm 61 thereof will contact with one of the pins 59 of the plate 57, and this plate will be rotated the quadrant of a circle, or a proportion thereof, for rotating the disk 73 to indicate in the opening 79 of the door a gallon, or a greater quantity than a quart of the liquid dispensed.

In the foregoing description I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. In a liquid measuring device, the combination with a container adapted to carry a liquid of a receptacle having an outlet and an inlet and provided with an opening in its wall, a pipe connecting the container with the inlet of the receptacle for the passage of the liquid to said receptacle, said pipe having a cut-off cock interposed therein, a transparent plate held in the opening of the receptacle whereby a given quantity of the liquid may be observed when received therein, a pipe having one end fastened in the outlet of the receptacle, and means adapted to control the flow of the liquid through the outlet pipe.

2. In a liquid measuring device, the combination with a container adapted to carry a liquid, of a receptacle having an outlet and an inlet and provided with an opening in its wall, a pipe connecting the container with the inlet of the receptacle for the passage of liquid to the receptacle, said pipe having a cut-off cock interposed therein, means provided in the opening of the receptacle whereby a given quantity of the liquid will be observed when received in said receptacle, and means adapted to control the passage of the liquid through the outlet of the receptacle.

3. In a liquid measuring device, the combination with a container adapted to carry a liquid, of a receptacle having an outlet and an inlet, and provided with an opening in its wall, means adapted to provide a passage for the liquid from the container to the inlet of the receptacle and serving to control the flow of the liquid, means provided in the opening of the receptacle whereby a given quantity of the liquid will be observed when received in said receptacle, and a cut-off valve adapted to control the flow of the liquid through the outlet of the receptacle.

4. In a liquid measuring device, the combination with a container adapted to carry a liquid, of a receptacle having an outlet and an inlet, means adapted to provide a passage for the liquid from the container to the receptacle through its inlet and serving to control the flow of the liquid, means provided in the opening of the receptacle whereby a given quantity of the liquid will be observed when received in said receptacle, means adapted to control the passage of the liquid through the outlet of the receptacle, and means adapted to register the quantity of liquid dispensed from the receptacle at intervals.

5. In a liquid measuring device, the combination with a container adapted to carry a liquid, of a receptacle having an outlet and an inlet, means adapted to provide a passage for the liquid from the container to the receptacle through its inlet and serving to control the flow of the liquid, an indicator provided upon the receptacle whereby a given quantity of the liquid will be observed when received in said receptacle, means adapted to control the passage of the liquid through the outlet of the receptacle, and means adapted to register the quantity of liquid dispensed from the receptacle at intervals.

6. In a liquid measuring device, the combination with a container adapted to carry a liquid, of a receptacle having an outlet and an inlet, a pipe connecting the container with the inlet of the receptacle, said pipe having a cut-off cock interposed therein, an indicator provided upon the receptacle whereby a given quantity of the liquid will be observed when received in said receptacle, means adapted to control the passage of the liquid through the outlet of the receptacle, and means adapted to register the quantity of liquid dispensed from the receptacle at intervals.

7. In a liquid measuring device, the combination with a container adapted to carry a liquid, of a receptacle having an outlet and an inlet and provided with an opening in its wall, a pipe connecting the container with the inlet of the receptacle and having a cut-off cock interposed therein, an indicator provided in the opening of the receptacle whereby a given quantity of the liquid will be observed when received in said receptacle, a valve adapted to control the passage of the liquid through the outlet of the receptacle, and means adapted to register the quantity of liquid dispensed from the receptacle at intervals.

8. In a liquid measuring device, the combination with a container adapted to carry a liquid, of a receptacle having an outlet and an inlet and provided with an opening in its wall, means adapted to provide a passage for the liquid from the container to the receptacle through its inlet and serving to control the flow of the liquid, means provided in the opening of the receptacle whereby a given quantity of the liquid will be observed when received in said receptacle, means adapted to control the passage of the liquid through the outlet of the receptacle, and means adapted to register the total quantity of liquid dispensed from the receptacle at consecutive intervals.

9. In a liquid measuring device, the combination with a container adapted to carry a liquid, of a receptacle having an outlet and an inlet and provided with an opening in its wall, means adapted to provide a passage for the liquid from the container to the receptacle through its inlet and serving to control the flow of the liquid, an indicator provided in the opening of the receptacle whereby a given quantity of the liquid will be observed when received in said receptacle, means adapted to control the passage of the liquid through the outlet of the receptacle, and means adapted to register the total quantity of liquid dispensed from the receptacle at consecutive intervals.

10. In a liquid measuring device, the combination with a container adapted to carry a liquid, of a receptacle having an outlet and an inlet, means adapted to provide a passage for the liquid from the container to the receptacle through its inlet and serving to control the flow of the liquid, means provided in the opening of the receptacle whereby a given quantity of the liquid will be observed when received in said receptacle, means adapted to control the passage of the liquid through the outlet of the receptacle, and a register adapted to indicate the quantity of liquid dispensed from the receptacle at intervals.

11. In a liquid measuring device, the combination with a container adapted to carry a liquid, of a receptacle having an outlet and an inlet, means adapted to provide a passage for the liquid from the container to the receptacle through its inlet and serving to control the flow of the liquid, means provided in the opening of the receptacle whereby a given quantity of the liquid will be observed when received in said receptacle, means adapted to control the passage of the liquid through the outlet of the receptacle, and a register adapted to indicate the total quantity of the liquid dispensed from the receptacle at consecutive intervals.

12. In a liquid measuring device, the combination with a container adapted to carry a liquid, of a receptacle having an outlet and an inlet, means adapted to provide a passage for the liquid from the container to the receptacle through its inlet and serving to control the flow of the liquid, means provided in the opening of the receptacle whereby a given quantity of the liquid will be observed when received in said receptacle, means adapted to control the passage of the liquid through the outlet of the receptacle, a register adapted to indicate a given quantity of liquid dispensed from the receptacle at intervals and also indicate the total quantity of the liquid dispensed from the receptacle at consecutive periods.

This specification signed and witnessed this first day of May A. D. 1912.

POLIKARB VON BARTKOWSKI.

Witnesses:
ROBT. B. ABBOTT,
M. DERMODY.